(12) United States Patent
Srinivasan et al.

(10) Patent No.: US 10,404,594 B2
(45) Date of Patent: Sep. 3, 2019

(54) SYSTEM AND METHOD FOR PROVIDING PARTITIONS OF CLASSIFICATION RESOURCES IN A NETWORK DEVICE

(71) Applicant: Oracle International Corporation, Redwood Shores, CA (US)

(72) Inventors: Arvind Srinivasan, San Jose, CA (US); Marcelino Dignum, Menlo Park, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 246 days.

(21) Appl. No.: 15/377,320

(22) Filed: Dec. 13, 2016

(65) Prior Publication Data

US 2018/0167318 A1    Jun. 14, 2018

(51) Int. Cl.
*H04L 12/749* (2013.01)
*H04L 12/741* (2013.01)
*H04L 12/851* (2013.01)

(52) U.S. Cl.
CPC .......... *H04L 45/741* (2013.01); *H04L 45/745* (2013.01); *H04L 47/2441* (2013.01)

(58) Field of Classification Search
CPC .. H04L 45/741; H04L 45/745; H04L 47/2441
See application file for complete search history.

(56) References Cited

U.S. PATENT DOCUMENTS 7,154,888 B1    12/2006  Li
7,783,654 B1     8/2010  Sreenath
(Continued)

FOREIGN PATENT DOCUMENTS

CN    1968212    5/2007
WO    2012081148    6/2012

OTHER PUBLICATIONS

European Patent Office, International Searching Authority, International Search Report and Written Opinion dated Feb. 23, 2018 for International Application No. PCT/US2017/061142, 11 pages.
(Continued)

*Primary Examiner* — Jianye Wu
(74) *Attorney, Agent, or Firm* — Tucker Ellis LLP (57) ABSTRACT

In accordance with an embodiment, described herein is a system and method for partitioning classification resources in a network device in a high performance network. Classification resources can be configured into a plurality of levels of partitions, with one or more hardware-based partitions configured to store flow entries associated with frequently-used or performance-sensitive flows, and a firmware-based partition to access large lookup tables stored in one or more additional memories for classification resource scalability. A lookup key can be used for search for a flow entry match in the hardware-based partitions first. If there is a miss, the lookup key can be presented to the firmware-based partition for further search. Results from the firmware-based level can be dispatched back to a hardware-based parser for further processing. Flow entries can be moved between lookup tables by a partition management block based on utilization of the flow entries.

19 Claims, 4 Drawing Sheets

(56) References Cited

U.S. PATENT DOCUMENTS

| | | |
|---|---|---|
| 2004/0213235 A1 | 10/2004 | Marshall |
| 2005/0141519 A1* | 6/2005 | Rajgopal ................. H04L 45/00 370/395.32 |
| 2006/0251109 A1 | 11/2006 | Muller |
| 2008/0037546 A1 | 2/2008 | Ishikawa |
| 2008/0109565 A1* | 5/2008 | Ajanovic ............. G06F 1/3203 710/8 |
| 2008/0134283 A1* | 6/2008 | Park ................... H04L 63/0227 726/1 |
| 2008/0186971 A1 | 8/2008 | Carmichael |
| 2012/0155472 A1 | 6/2012 | Jun |
| 2013/0034100 A1 | 2/2013 | Goyal |
| 2013/0163475 A1 | 6/2013 | Beliveau |
| 2013/0163595 A1 | 6/2013 | Doo |
| 2014/0219283 A1 | 8/2014 | Park |
| 2015/0193681 A1 | 7/2015 | Stark |
| 2015/0244842 A1 | 8/2015 | Laufer |
| 2015/0358290 A1 | 12/2015 | Jain |
| 2016/0094460 A1 | 3/2016 | Shelar |
| 2016/0239525 A1 | 8/2016 | Treves |
| 2016/0316044 A1 | 10/2016 | Treves |
| 2017/0052731 A1 | 2/2017 | Levy |
| 2017/0063690 A1 | 3/2017 | Bosshart |

OTHER PUBLICATIONS

Sundar Iyer et al., "ClassiPI™: An Architecture for Fast and Flexible Packet Classification", PMC-Sierra Inc., 2001, 13 pages.

Ravikumar V.C. et al., "TCAM Architecture for IP Lookup Using Prefix Properties", Published by the IEEE Computer Society, © 2004 IEEE, Mar.-Apr. 2004, 10 pages.

Sameer Agarwal et al., "Lattice: A Scalable Layer-Agnostic Packet Classification Framework", Electrical Engineering and Computer Sciences University of California at Berkeley, Technical Report No. UCB/EECS-2011-96, Aug. 24, 2011, © 2011, 14 pages.

European Patent Office, International Searching Authority, International Search Report and Written Opinion dated Feb. 15, 2018 for International Application No. PCT/US2017/061148, 11 pages.

\* cited by examiner

FIGURE 4

SYSTEM AND METHOD FOR PROVIDING PARTITIONS OF CLASSIFICATION RESOURCES IN A NETWORK DEVICE

CROSS-REFERENCES TO RELATED APPLICATIONS

This patent application is related to U.S. patent application titled "SYSTEM AND METHOD FOR PROVIDING A PROGRAMMABLE PACKET CLASSIFICATION FRAMEWORK FOR USE IN A NETWORK DEVICE", U.S. patent application Ser. No. 15/377,303, filed Dec. 13, 2016, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to high performance networks, and are particularly related to a system and method for providing partitions of classification resources in a network device in a high performance network.

BACKGROUND

A high performance network fabric, for example, Infini-Band and Ethernet, can provide high throughput connectivity for multiple datacenter servers. The traffic streams related to various virtual machines (VMs) flowing through the fabric can consists of various classes of traffic per application needs such as low-latency flows and high-throughput bulk transfer flows.

Traffic through a high performance fabric can include virtualized traffic streams to/from various VMs in a datacenter. Overlay networks enables a datacenter to scale above and beyond the limitation of an existing network due to the emergence of newer overlay protocols. The scaling can add additional packet parsing and processing complexity.

For example, in addition to the packet parsing complexity with larger datacenters/networks, the number of L2-L4 packet parsing and enforcement rules tends to be quite large, which adds complexity to packet parsing and packet-parsing hardware to keep up with the performance targets, for example, in terms of throughput, latency, and power.

As overlay network protocols evolve and are deployed in large datacenters, portions of network protocol level offloads are performed at the lowest hardware component level (e.g., at a network interface card or a switch, or a combination thereof) to keep up with higher throughput and low latency requirements. The protocol level offloads require coarse to fine grain flow (for example, L2-L4) identification for network packets. This process typically involves packet parsing for identifying fields out of the packet and matching them against rules/policies programmed in lookup tables, for example, lookup tables in ternary content-addressable memories (TCAMs). With a large number of flows present in traffic streams and with high aggregate throughput, it would be advantageous to have a solution that can both scale and keep up with performance targets.

SUMMARY

In accordance with an embodiment, described herein is a system and method for providing classification resource partitions in a network device in a high performance network. Classification resources can be configured into a plurality of levels of partitions, with one or more hardware-based partitions configured to store flow entries associated with frequently-used or performance-sensitive flows, and a firmware-based partition to access large lookup tables stored in one or more additional memories for classification resource scalability. A lookup key can be used for search for a flow entry match in the hardware-based partitions first. If there is a miss, the lookup key can be presented to the firmware-based partition for further search. Results from the firmware-based level can be dispatched back to a hardware-based parser for further processing. Flow entries can be moved between lookup tables by a partition management block based on utilization of the flow entries.

DETAILED DESCRIPTION

In a high performance network, packet classification refers to the process of categorizing data packets into "flows", so that all data packets belonging to the same flow obey a predefined rule and are processed in a similar manner. Packet classification can be required for non-best-effort services, such as firewalls and quality of service.

For example, all packets with the same source and destination IP addresses can be identified to form a flow.

In accordance with an embodiment, a network device can rely on classification primitives for data packet processing. Example classification primitives can include packet parsers, and classification/lookup tables stored in binary content addressable memories (BCAM), ternary content addressable memories (TCAM) and random-access memories (RAM). Each lookup table can include a plurality of flow entries.

In accordance with an embodiment, each flow entry can contain a plurality of match fields to match against data packets. The match fields can include an ingress port, packet headers, and optionally other pipeline fields such as metadata specified by a previous table. A flow entry can also include a priority field indicating the matching precedence of the flow entry, a counter field that can be updated when packets are matched, instructions for modifying the action set or pipeline processing. A flow entry can also include flow rules and policies used to filter data packets.

In accordance with an embodiment, flow entries can be automatically populated or created by system administrators. As such, the formats or fields in a lookup table may be different based on the needs of an application. For example, flow entries can include values in bytes selected from one or more headers of a data packet and a key mask.

A typical packet processing application involves packet parsing to identify various fields from a network packet, compose a key, and perform lookup/search on one or more lookup tables. Depending upon the fields that are chosen to compose the key, the type of table used for the lookup/search may be different. Similarly, the size required for lookup tables may vary depending upon applications. For example, an application may require a very large L2 lookup table and a shallow L3 lookup table, and another application may require similar sizes for both lookup tables.

As a high performance network is required to support an increasing number of overlay protocols, and an increasing number of flows, the size of lookup tables can increase with more flow entries. Since classification resources such as lookup tables are different in terms of implementation cost and lookup speed, it would be advantageous to have a solution that can both scale and keep up with performance targets.

In accordance with an embodiment, described herein is a system and method for providing classification resource partitions in a network device in a high performance network. Classification resources can be configured into a plurality of levels of partitions, with one or more hardware-based partitions configured to store flow entries associated with frequently-used or performance-sensitive flows, and a firmware-based partition to access large lookup tables stored in one or more additional memories for classification resource scalability. A lookup key can be used for search for a flow entry match in the hardware-based partitions first. If there is a miss, the lookup key can be presented to the firmware-based partition for further search. Results from the firmware-based level can be dispatched back to a hardware-based parser for further processing. Flow entries can be moved between lookup tables by a partition management block based on utilization of the flow entries.

In accordance with an embodiment, the hardware-based partitions of classification resources can include one or more TCAMs in a level-1 partition, and one or more hash tables in a level-2 partition. The firmware-based partition can represent a level-3 partition of classification resources, and can include an embedded processor subsystem comprising multiple network processing elements (PEs), and each PE can be based on a full-fledged microprocessor, or a microcontroller, or a state-machine-based hardware engine.

In accordance with an embodiment, the partition management block can be a mix of hardware-based actions and firmware-based actions to efficiently manage lookup tables and flow entries in each partition of classification resources, so that a given performance target can be met. The system can support a plurality of features to facilitate the management actions related to lookup tables.

The framework can be used to manage and scale large amounts of classification resources that are partitioned as a hierarchy of TCAMs, hash tables, and a firmware-based subsystem connected to an external or remote memory, with caching at each level. Each level in the hierarchy can store flow entries, and can vary in terms of throughput, latency, and power consumption. The framework described herein is independent of the type of underlying networking technology such as InfiniBand or Ethernet, and can be applied uniformly to a plurality of network technologies.

Classification Resource Partitions

Figure 1:
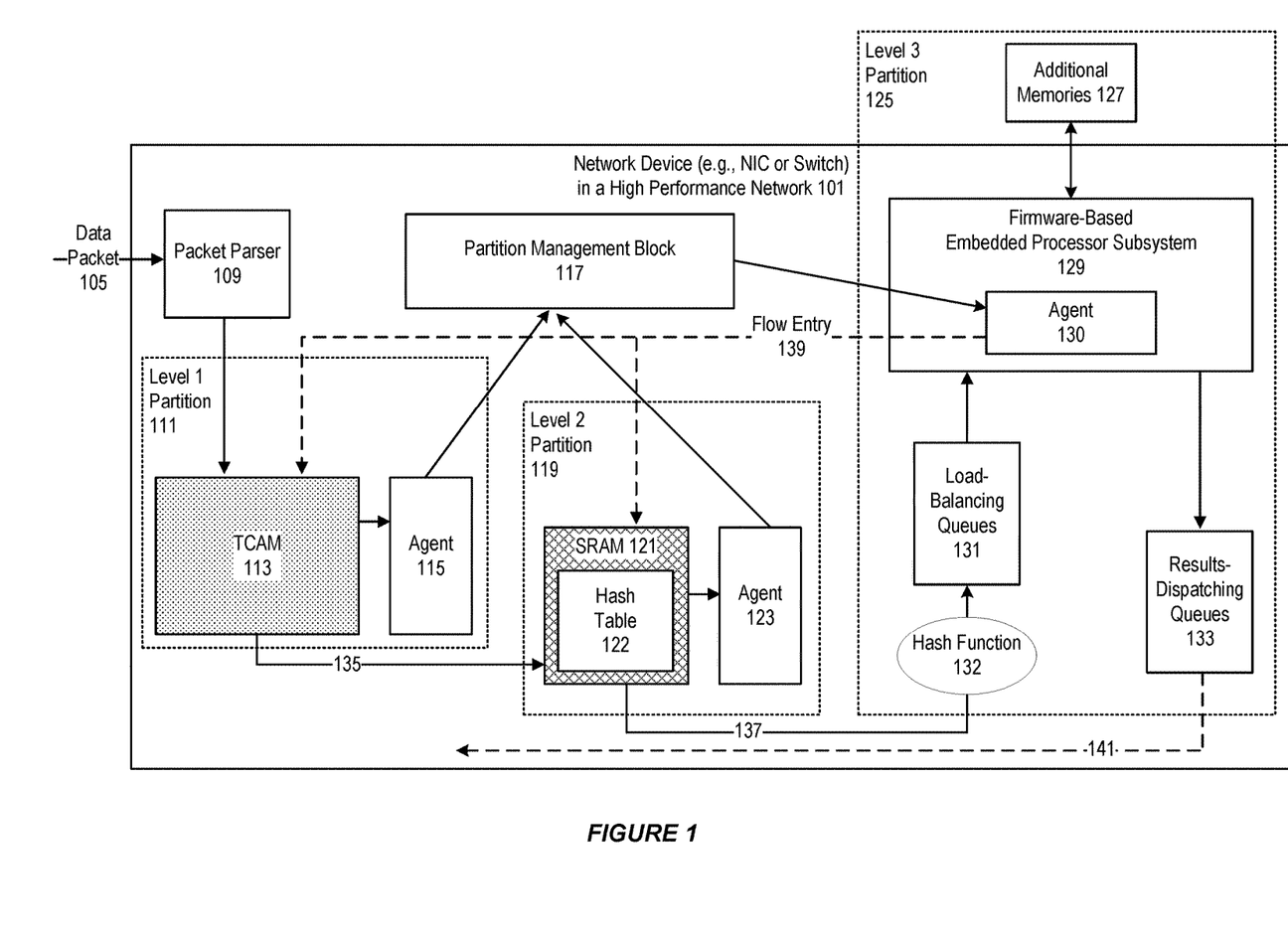
FIG. 1 illustrates a system for providing classification resource partitions in a network device in a high performance network, in accordance with an embodiment.

FIG. 1 illustrates a system for providing classification resource partitions in a network device in a high performance network, in accordance with an embodiment.

As shown in FIG. 1, a network device 101 in a high performance network, for example, an InfiniBand, can include a plurality of classification resources, for example, lookup tables stored in BCAMs, TCAMs, and RAMs.

In accordance with an embodiment, the lookup tables can be organized as generic library elements configured to be of any type during runtime. Each lookup table can be configured with a unique ID used for lookup purposes. As part of the lookup key generation and composition, the unique table id can be generated. An ID of a lookup key and an ID of a lookup table have to match each other for a lookup result from the lookup table to be valid. Lookup table IDs and lookup key IDs thereby can enable a classification framework to partition classification resources through rearranging lookup tables and resizing them.

For example, a plurality of lookup tables with IDs within a particular range can be placed in a partition by configuration. By configuring lookup keys with IDs in the same range, searches for flow entry matches can be directed to the partition.

As shown in FIG. 1, the classification resources in the system, for example, lookup tables, can be configured into three partitions.

In accordance with an embodiment, a level-1 partition of classification resources 111 can include one or more programmable TCAMs (for example, TCAM 113) with lookup tables stored therein. The TCAMs can serve as a level-one (L1) cache to store flow entries associated with flows that are frequently in use or performance-sensitive.

In accordance with an embodiment, a level-2 partition of classification resources 119 can include one or more programmable hash tables (for example, hash table 122), and each hash table can can include hash table buckets storing flow entries, and can be based on a static random-access memory (SRAM) 121.

Since matching on a hash table can result in aliasing, multiple lookups may be needed within a hash table to resolve collision/aliases. The size of each hash table can be configurable, and can be significantly large, compared to that of a TCAM, to support a greater number of flow entries. A linked list chain that can be created or traversed as part of the hash table can be limited to a fixed number, and can be configurable per a particular throughput requirement.

In accordance with an embodiment, a level-3 partition of classification resources 125 can include a firmware-based embedded processor subsystem 129 configured to access lookup tables stored in one or more additional memories 127. The additional memories can include an external memory attached to the network device, for example, a double date rate (DDR) memory based on a dual in-line memory module (DIMM); a remote memory that can be accessed over a network; and a system memory that can accessed over peripheral component interconnect express (PCIe), a high-speed serial computer expansion bus component.

The media described above used to implement each classification resources in each partition are provided as an illustrative example. A person skilled in the art would understand that other media can be similarly used to implement the classification resource partitions in the system.

In accordance with an embodiment, classification resources in the level-1 partition can be small in terms of storing flow entries, rules and policies; more costly in terms of price and power consumption; and yet faster in terms of performance. Classification resources in the level-2 partition can be bigger and less costly, yet slower in terms of performance. Classification resources in the level-3 partition can have a large latency yet can be used to store as many rules, policies and flow entries as needed through accessing additional memories, for example, attached memories and network memories.

In accordance with an embodiment, the size of each partition can be determined as a tradeoff between a plurality of factors, including application needs, a required performance target, and associated hardware complexity in terms of area (e.g., where an offload engine resides) and/or power consumption.

In accordance with an embodiment, the level-2 partition of classification resources and the level-3 partition of classification resources can be considered an extension to the first level of classification resources. Data packets through the network device 101 can be directed to the first level of classification resources first, and only when a hit is not found in the level-1 partition, for example, in a lookup table in a TCAM, the data packet is directed to the second level. If a hit is not found in the level-2 partition, the packet is directed to the level-3 partition.

In this disclosure, in accordance with an embodiment, when a data packet is directed to a lookup table in a partition of classification resources, a lookup key composed from one or more header fields of the data packet is presented to the lookup table for a flow entry match.

As an illustrative example, as shown in FIG. 1, when a data packet 105 received at a packet parser 109, the packet parser can locate and extract one or more bytes representing one or more header fields in the data packet, and construct a lookup key, which can be directed to the TCAM 113 first for a match against a flow entry based on specified policies and rules. If there is a miss, the lookup key is directed 135 to the hash table 122, and if there is a miss in the hash table, the lookup key is directed 137 to the firmware-based embedded processor subsystem 129.

In accordance with an embodiment, the firmware-based embedded processor subsystem can also be used for cases where either the rules overflow, or new rules or new flow entries are encounter in the level-1 partition and the level-2 partition.

In accordance with an embodiment, the latency of processing through the firmware-based embedded processor subsystem can be large and vary depending upon the state of the lookup key and the policy under search. To mitigate the overall latency and to keep up with overall throughput requirements, multiple processing elements (PEs) can be provided in the firmware-based embedded processor subsystem to work in parallel. Each PE can be based on a full-fledged microprocessor, or a microcontroller, or a state-machine-based hardware engine.

In accordance with an embodiment, a hash function 132 can be used in conjunction with a plurality of load-balancing queues 131, to spread work loads among the multiple PEs, and to maintain flow affinity and packet ordering. Results from the PEs can be dispatched 141 back to the hardware-based packet parser 109 for further processing through a plurality of results-dispatching queues 133.

In accordance with an embodiment, both the load-balancing queues and the results-dispatching queues can be hardware-based, for example, based on direct memory access (DMA) engines.

Classification Resource Management

As further shown in FIG. 1, a partition management block 117 can be provided in the network device to manage lookup tables in each partition to meet a given performance target. A plurality of table management threads can be provided by the firmware-based embedded processor subsystem for use by the partition management block in managing the lookup tables. The partition management block can comprise a mix of actions based on hardware and firmware.

In accordance with an embodiment, the partition management block can communicate with an agent in each of the three levels of partitions, for example, an agent 115 in the level-1 partition, an agent 123 in the level-2 partition, and an agent 130 in the level-3 partition.

In accordance with an embodiment, the partition management block can collect information regarding hits and misses from the agents 115 and 123, and use the information to determine whether a lookup key needs to be directed to a next level of partition for further search.

In accordance with an embodiment, to facilitate actions related to table management, each of the agents 115, 123, and 131 can include a scoreboard for each flow entry in a lookup table in their respective partitions. The scoreboard can keep track of the number of hits and misses of a flow entry, the frequency of the hits and misses in a given time period, and the number of times that the flow entry has been accessed by the system. The scorecard values can be decremented periodically for lack of matches.

In accordance with an embodiment, if a scorecard value in the level-1 partition or the level-2 partition falls below a given threshold, the associated flow entry can be marked invalid, which can result in either a complete removal of the flow entry from both a TCAM and a hash table, or a removal of the flow entry from the TCAM and an insertion of the flow entry into the hash table, or a removal of the flow entry from the hash table and an insertion of the flow entry into the TCAM. The invalidation of a flow entry can result in a miss in a lookup table. The removal of a flow entry can be driven by policies through an overall system configuration.

In accordance with an embodiment, each of the agent in the hardware-based partition (i.e. the level-1 partition and the level-2 partition) can use a cache replacement algorithm or policy, for example, least recently used (LRU) or least frequently used (LFU), to manage the TCAMs (L1 cache) or the hash tables (L2 cache), for example, to determine which flow entry to be removed from a lookup table.

In accordance with an embodiment, the agent 130 in the level-3 partition can work in conjunction with the partition management block to update the caches for low latency flows.

For example, if a search of a given flow entry results in a miss in both a TCAM and a hash table, and the search ends up being handled by a PE in the level-3 partition, the firmware agent 130 can add the given specific flow entry 139 into a lookup table in either the level-1 partition or the level-2 partition based on policies stored locally in the level-3 partition.

Classification Resource Scalability

In accordance with an embodiment, the classification resources can be configured through generic library elements and can be logically arranged as a hierarchy of caches. Lookup keys can be generated through a packet parsing engine or a packet parser from headers of data packets. Each lookup key can be composed along with a table ID. The lookup key can be presented to a lookup table with the table ID, and results from the lookup table can be dispatched back to the packet processing engine or the packet parser for further processing.

In accordance with an embodiment, the above-described classification resource partitioning framework can be used to scale up the partitioned classification resources, so that a large number of flow entries, rules, and policies can be supported.

Figure 2:
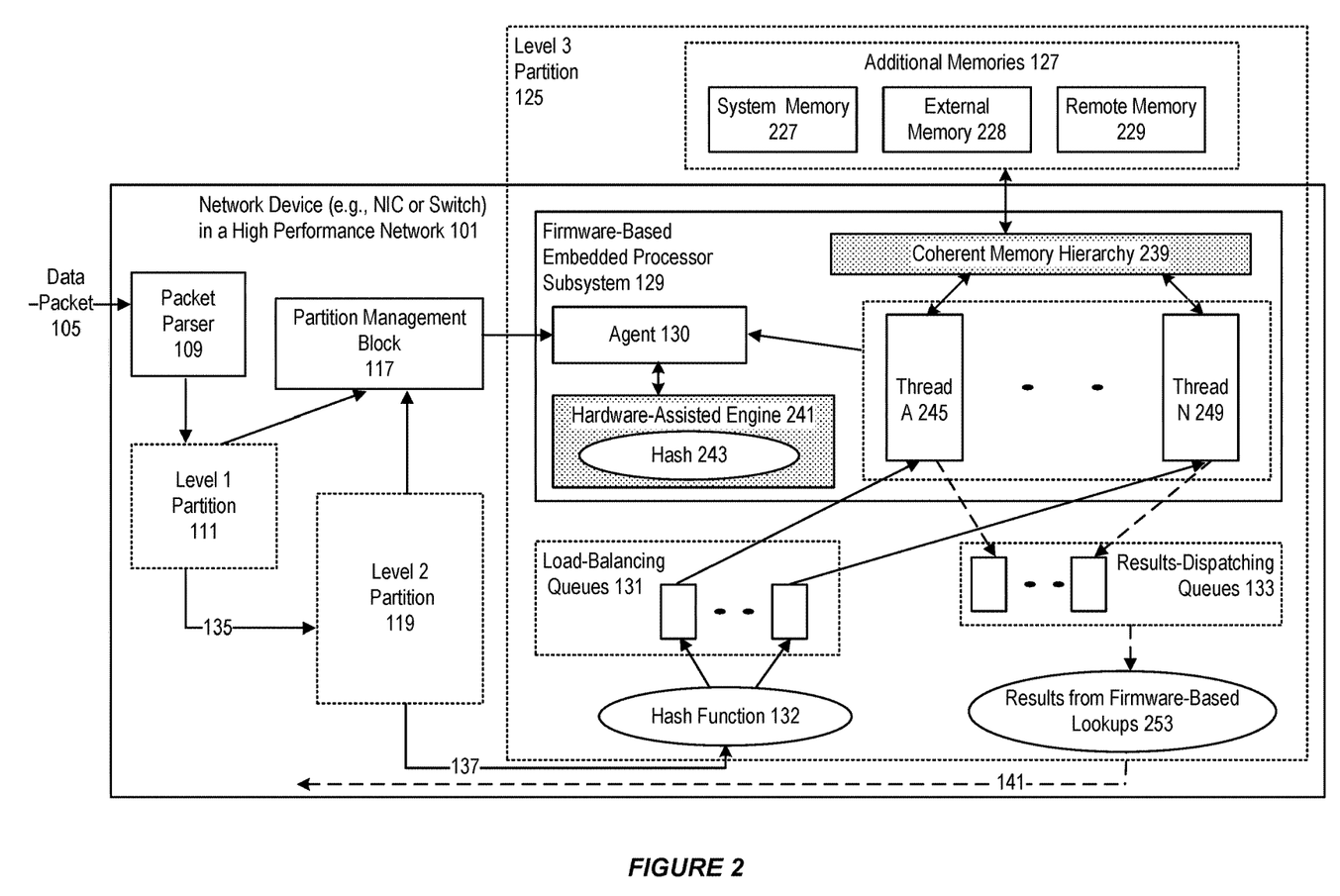
FIG. 2 further illustrates a system for providing classification resource partitions in a network device in a high performance network, in accordance with an embodiment.

FIG. 2 further illustrates a system for providing classification resource partitions in a network device in a high performance network, in accordance with an embodiment.

More particularly, FIG. 2 illustrates scaling up classification resources in the system in accordance with an embodiment.

In accordance with an embodiment, as described above, the firmware-based embedded processor subsystem can include multiple network processing elements (PEs) configured to access one or more additional memories 127 via a Coherence memory hierarchy 239. Examples of the additional memories include an external memory 228 attached to the network device, a remote memory 229 that can be accessed over a network, and a system memory 227 that can accessed over peripheral component interconnect express (PCIe).

In accordance with an embodiment, the multiple PEs can work in parallel to manage searches in lookup tables in the one or more additional memories 125 for flow entries that may not exist in the hardware caches, for example, lookup tables in the level-1 partition and the level-2 partition. The actual searches can be performed by one or more hardware-assisted engines in the firmware-based embedded processor subsystem, and the PEs are configured to provide efficient access to the one or more additional memories.

As shown in FIG. 2, a plurality of processing threads, for example, thread A 245 through thread N 249 can be used for flow entry searches in the one more additional memories. Each thread can be a firmware thread.

Since the flow entry searches may take variable amounts of latency, the processing threads can be assigned to the multiple PEs based on a current load of a PE and flow affinity.

In accordance with an embodiment, one or more hardware-assisted engines, for example, a hardware-assisted engine 241, can be used to dispatch search tasks to each PE. A hash 243 can be calculated by the hardware-assisted engine based on one or more packet headers, or bytes selected from the one or more packet headers. Based on the hash, a specific processing thread can be assigned to each PE.

In accordance with an embodiment, a plurality of DMA-engines-based load-balancing queues 131, each of which is specific to a processing thread, can be provided between the hardware-based block (which can include the level-1 partition and the level-2 partition) and interfaces of the PEs in the firmware-based partition. The enqueuing of each load-balancing queues can be controlled by the hardware-based block, and the dequeuing of each load-balancing queues can be controlled by the firmware-based embedded processor subsystem.

In accordance with an embodiment, once required packet headers or bytes selected from the headers that constitute a lookup key is dequeued by a PE, the PE can kick off a search process, which can perform a hash table search or another search algorithm. As results from search processes are available, the results can be dispatched back into the plurality of results-dispatching queues, so that the results 253 can be sent back to the packet parser for further processing. The results-dispatching queues can be hardware queues, for example, queues based on DMA engines.

In accordance with an embodiment, the use of the load-balancing queues and the results-dispatching queues can provide packet ordering and flow affinity maintenance. For example, the load-balancing queues can queue lookup keys or data packets so that the lookup keys or data packets can be processed in order. The results-dispatching queues can be used to send back the processing results so that the results can be processed by the packet processor in order.

In accordance with an embodiment, in addition to using multiple PEs to work in parallel, the level-3 partition can also use a plurality of various hardware-assisted engines to reduce processing latency of each processing thread.

For examples, the hardware-assisted engine 241 is used to calculate the hash, one or more hardware-assisted engines are used to perform searches for flow entry matches, and one or more DMA engines are used to implement and/or manage the results-dispatching queues and the load-balancing queues.

As shown in FIG. 2, each of the load-balancing queues and each of the results-dispatching queues can be associated with one of the plurality of processing threads 245 through 249. Additional threads can be available in the firmware-based embedded processor subsystem for use in managing and updating lookups tables in the system Updating Lookup Tables In accordance with an embodiment, the firmware-based embedded processor subsystem can manage lookup tables in the level-3 partition and to work in conjunction with the partition management block 117 to update lookup tables that stores low latency flow entries in the level-1 partition and the level-2 partition.

In accordance with an embodiment, the lookup tables in the system can be managed by one or more table management threads. Each flow entry can be associated with a scorecard that keeps track of the number of hits/misses and the frequency of the hits and misses in a given time period. Thresholds maintained by the partition management block can be used as a trigger to generate interrupts to the one or more management threads, so that the table management threads can remove flow entries from a lookup table based one of the thresholds.

Similarly, in accordance with an embodiment, the processing threads can keep track of the number of flow entries that have been frequently searched due to misses in lookup tables in the level-1 partition and the level-2 partition. As a threshold exceeds a configurable threshold, a processing thread can dispatch a request to a table management thread, so that the management thread can insert the frequently used flow entry into back into a lookup table in either the level-1 partition or the level-2 partition. The insertion of the flow entry can be driven based on policies such as frequency of updates and cache eviction policies.

Figure 3:
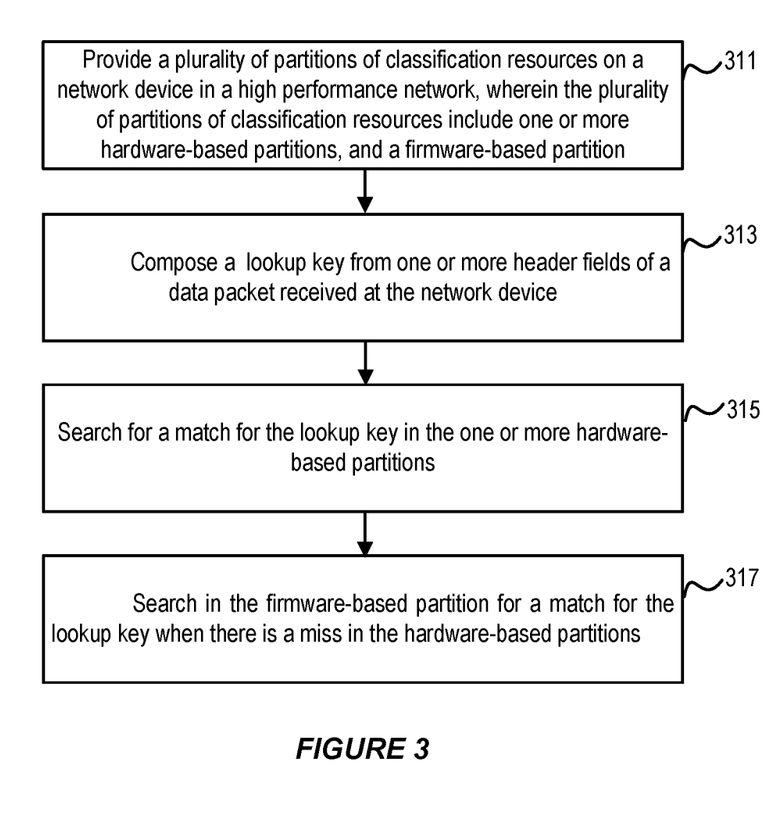
FIG. 3 illustrates a method for providing classification resource partitions in a network device in a high performance network, in accordance with an embodiment.

FIG. 3 illustrates method for providing classification resource partitions in a network device in a high performance network, in accordance with an embodiment.

As shown in FIG. 3, at step 311, a plurality of partitions of classification resources are provided on a network device in a high performance network, wherein the plurality of partitions of classification resources include one or more hardware-based partitions, and a firmware-based partition.

At step 313, a lookup key is composed from one or more header fields of a data packet received at the network device.

At step 315, one or more searches are performed for a match for the lookup key in the one or more hardware-based partitions.

At step 317, a search is performed in the firmware-based partition for a match for the lookup key when there is a miss in the hardware-based partitions.

InfiniBand™

InfiniBand™ (IB) is an example high performance network in which the system and method described above can be used.

InfiniBand™ is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, intra-subnet routing in an IB network can be based on LFTs stored in the switches. The LFTs are calculated by the SM according to the routing mechanism in use. In a subnet, Host Channel Adapter (HCA) ports on the end nodes and switches are addressed using local identifiers (LIDs). Each entry in an LFT consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

Figure 4:
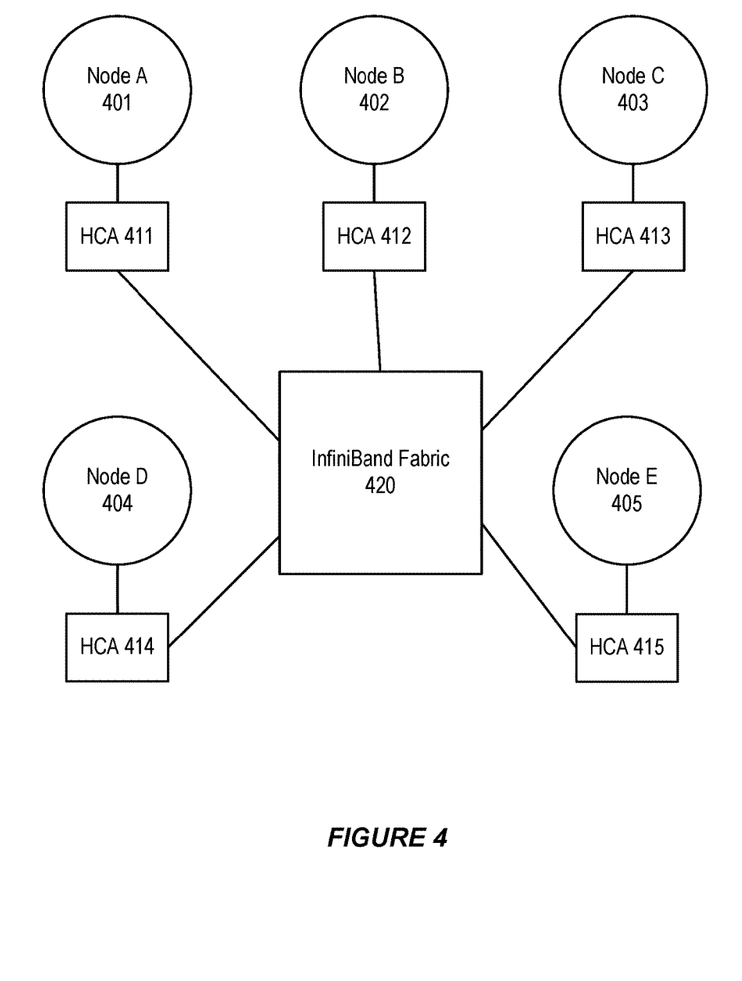
FIG. 4 shows an example high performance network, in accordance with an embodiment.

An example InfiniBand fabric is shown in FIG. 4, which shows an illustration of an InfiniBand environment, in accordance with an embodiment. In the example shown in FIG. 1, nodes A-E, 401-405, use the InfiniBand fabric 620, to communicate, via the respective host channel adapters 411-415. In accordance with an embodiment, the various nodes, e.g., nodes A-E 401-405, can be represented by various physical devices. In accordance with an embodiment, the various nodes, e.g., nodes A-E 401-405, can be represented by various virtual devices, such as virtual machines.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for providing classification resource partitions in a network device in a high performance network, comprising:
   a network device in a high performance network;
   a hardware-based level-1 classification resource partition comprising a ternary content-addressable memory (TCAM);

a hardware-based level-2 classification resource partition comprising a hash table based on a static random-access memory (SRAM);

a firmware-based level-3 classification resource partition which comprises a plurality of processing threads and a plurality of hardware-based processing elements (PEs) configured to access one or more additional memories;

a plurality of flow entries stored in the level-1, level 2, and level-3 classification resource partitions and a lookup key composed from one or more header fields of a data packet received at the network device;

wherein the network device is configured to search for a flow entry matching the lookup key in the level-1 classification resource partition, and when there is a miss in the level-1 classification resource partition, search for the flow entry matching the lookup key in the level-2 classification resource partition, and when there is a miss in the level-1 and level 2 classification resource partitions, search in the firmware-based level-3 classification resource partition for the flow entry matching the lookup key; and wherein the plurality of processing threads are configured to keep track of a number of flow entries that have been searched in the level-3 classification resource partition due to misses in the level-1 classification resource partition and the level-2 classification resource partition, and to dispatch a request to a table management thread to insert a flow entry from the level-3 classification resource partition into either the level-1 classification resource partition or the level-2 classification resource partition if the number exceeds a threshold.

2. The system of claim 1, wherein the threshold is configurable.

3. The system of claim 1, wherein each of the level-1 classification resource partition, the level-2 classification resource partition, and level-3 classification resource partition includes one or more lookup tables, wherein the one or more lookup tables are configured into that partition using their table identifiers (IDs).

4. The system of claim 1, further comprising
a partition management block that uses a plurality of table management threads provided by the firmware-based partition to manage lookup tables in each of the level-1 classification resource partition, the level-2 classification resource partition, and level-3 classification resource partition.

5. The system of claim 1, wherein each of the level-1 classification resource partition, the level-2 classification resource partition includes an agent, wherein the agent includes a scoreboard for each flow entry in a lookup table in that partition, wherein the scoreboard records a number of hits and misses of each flow entry, and a frequency of the hits and misses in a given time period.

6. The system of claim 1, wherein each of the hardware-based processing elements (PEs) comprises a state-machine based hardware engine configured to access one or more additional memories.

7. The system of claim 1, wherein the one or more additional memories include one of an external memory attached to the network device, a remote memory configured to be accessed over a network, and a system memory configured to be accessed over peripheral component interconnect express (PCIe).

8. The system of claim 1, wherein the plurality of PEs are configured to work in parallel to reduce processing latency, and wherein each PE is associated with one of a plurality of processing threads.

9. The system of claim 1, wherein a management thread is configured to evict table entries from the level-1 classification resource partition and the level-2 classification resource partition in response to a frequency of hits and misses in a time period.

10. The system of claim 1, wherein the firmware-based level-3 classification resource partition interfaces with the one or more hardware-based partitions through a plurality of hardware-based queues.

11. A method for providing classification resource partitions in a network device in a high performance network, comprising:

providing a hardware-based level-1 classification resource partition comprising a ternary content-addressable memory (TCAM);

providing a hardware-based level-2 classification resource partition comprising a hash table based on a static random-access memory (SRAM);

providing a firmware-based level-3 classification resource partition which comprises a plurality of processing threads and a plurality of hardware-based processing elements (PEs) configured to access one or more additional memories;

storing a plurality of flow entries stored in the level-1, level 2, and level-3 classification resource partitions;

composing a lookup key from one or more header fields of a data packet received at the network device;

searching for a flow entry matching the lookup key in the level-1 classification resource partition, and when there is a miss in the level-1 classification resource partition, searching for the flow entry matching the lookup key in the level-2 classification resource partition, and when there is a miss in the level-1 and level 2 classification resource partitions, searching in the firmware-based level-3 classification resource partition for the flow entry matching the lookup key; and tracking a number of flow entries that have been searched in the level-3 classification resource partition due to misses in the level-1 classification resource partition and the level-2 classification resource partition; and dispatching a request to a table management thread to insert a flow entry from the level-3 classification resource partition into either the level-1 classification resource partition or the level-2 classification resource partition if the number exceeds a threshold.

12. The method of claim 11, wherein the threshold is configurable.

13. The method of claim 11, wherein each of the level-1 classification resource partition, the level-2 classification resource partition, and level-3 classification resource partition includes one or more lookup tables, wherein the one or more lookup tables are configured into that partition using their table identifiers (IDs).

14. The method of claim 11, further comprising
using a plurality of table management threads provided by the firmware-based partition to manage lookup tables in each of the level-1 classification resource partition, the level-2 classification resource partition, and level-3 classification resource partition.

15. The method of claim 11, further comprising:
providing an agent in each of the level-1 classification resource partition and the level-2 classification resource partition, wherein the agent includes a scoreboard for each flow entry in a lookup table in that partition, wherein the scoreboard records a number of hits and misses of each flow entry, and a frequency of the hits and misses in a given time period.

16. The method of claim 11, wherein the one or more additional memories include one of an external memory attached to the network device, a remote memory configured to be accessed over a network, and a system memory configured to be accessed over peripheral component interconnect express (PCIe).

17. The method of claim 11, wherein the plurality of PEs are configured to work in parallel to reduce processing latency, and wherein each PE is associated with one of a plurality of processing threads.

18. The method of claim 11, further comprising:
    evicting table entries from the level-1 classification resource partition and the level-2 classification resource partition in response to a frequency of hits and misses in a time period.

19. A non-transitory computer-readable storage medium storing a set of instructions for providing a programmable packet classification framework in a network device in a high performance network, said instructions, when executed by one or more processors, causing the one or more processors to perform steps comprising:
    configuring a hardware-based level-1 classification resource partition in a ternary content-addressable memory (TCAM) of the network device;
    configuring a hardware-based level-2 classification resource partition comprising a hash table based on a static random-access memory (SRAM) of the network device;
    configuring a firmware-based level-3 classification resource partition which comprises a plurality of processing threads and a plurality of hardware-based processing elements (PEs) of the network device to access one or more additional memories;
    storing a plurality of flow entries stored in the level-1, level 2, and level-3 classification resource partitions;
    composing a lookup key from one or more header fields of a data packet received at the network device;
    searching for a flow entry matching the lookup key in the level-1 classification resource partition, and when there is a miss in the level-1 classification resource partition, searching for the flow entry matching the lookup key in the level-2 classification resource partition, and when there is a miss in the level-1 and level 2 classification resource partitions, searching in the firmware-based level-3 classification resource partition for the flow entry matching the lookup key; and
    tracking a number of flow entries that have been searched in the level-3 classification resource partition due to misses in the level-1 classification resource partition and the level-2 classification resource partition; and
    dispatching a request to a table management thread to insert a flow entry from the level-3 classification resource partition into either the level-1 classification resource partition or the level-2 classification resource partition if the number exceeds a threshold.

* * * * *

UNITED STATES PATENT AND TRADEMARK OFFICE
CERTIFICATE OF CORRECTION

PATENT NO. : 10,404,594 B2
APPLICATION NO. : 15/377320
DATED : September 3, 2019
INVENTOR(S) : Srinivasan et al.

Page 1 of 1

It is certified that error appears in the above-identified patent and that said Letters Patent is hereby corrected as shown below:

In the Specification

In Column 4, Line 36, delete "can can" and insert -- can --, therefor.

In Column 4, Lines 55-56, delete "can accessed" and insert -- can be accessed --, therefor.

In Column 7, Lines 17-18, delete "can accessed" and insert -- can be accessed --, therefor.

In Column 8, Line 22, delete "system" and insert -- system. --, therefor.

In the Claims

In Column 11, Line 9, in Claim 1, delete "level 2," and insert -- level-2, --, therefor.

In Column 11, Line 20, in Claim 1, delete "level 2" and insert -- level-2 --, therefor.

In Column 12, Line 29, in Claim 11, delete "level 2," and insert -- level-2, --, therefor.

In Column 12, Line 37, in Claim 11, delete "level 2" and insert -- level-2 --, therefor.

In Column 14, Line 7, in Claim 19, delete "level 2," and insert -- level-2, --, therefor.

In Column 14, Line 16, in Claim 19, delete "level 2" and insert -- level-2 --, therefor.

Signed and Sealed this
Twenty-fifth Day of August, 2020

Andrei Iancu
*Director of the United States Patent and Trademark Office*